United States Patent [19]

Chasse et al.

[11] Patent Number: 4,646,260

[45] Date of Patent: Feb. 24, 1987

[54] DATA COLLECTION TERMINAL HIGH SPEED COMMUNICATION LINK INTERRUPT LOGIC

[75] Inventors: Dennis W. Chasse, Nashua, N.H.; David R. Bourgeois, Framingham; Todd R. Comins, Chelmsford, both of Mass.

[73] Assignee: Honeywell Information Systems Inc., Waltham, Mass.

[21] Appl. No.: 538,697

[22] Filed: Oct. 3, 1983

[51] Int. Cl.⁴ ...................... G06F 13/14; G06F 15/00
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 4,240,140 | 12/1980 | Stafford et al. | 364/200 |
| 4,255,786 | 3/1981 | Holtey et al. | 364/200 |
| 4,275,458 | 6/1981 | Khera | 364/900 |
| 4,349,873 | 9/1982 | Gunter et al. | 364/200 |
| 4,479,179 | 10/1984 | Dinwiddie, Jr. | 364/200 |
| 4,519,028 | 5/1985 | Olsen et al. | 364/200 |
| 4,547,849 | 10/1985 | Louie et al. | 364/200 |

OTHER PUBLICATIONS

MCS-80/85 Family User's Manual, Intel, Oct. 1979, pp. 6-132 to 6-137.

*Primary Examiner*—James D. Thomas
*Assistant Examiner*—Thomas C. Lee
*Attorney, Agent, or Firm*—George Grayson; John S. Solakian

[57] ABSTRACT

A data collection terminal includes a microprocessor, a memory and a number of devices coupled to a system bus. Included among the devices is a communication controller. An interrupt controller processes the device interrupt requests by sending out a vector address to the microprocessor. This enables the microprocessor to branch to a subroutine to process the interrupt. Apparatus is provided to enable the communication controller to generate vector addresses when it sends an interrupt request to the interrupt controller.

14 Claims, 4 Drawing Figures

DATA COLLECTION TERMINAL HIGH SPEED COMMUNICATION LINK INTERRUPT LOGIC

RELATED APPLICATION

The following U.S. patent application filed on an even date with the instant application and assigned to the same assignee as the instant application is related to the instant application and is incorporated herein by reference.

"Data Collection Terminal Interrupt Structure" by Vincent M. Clark, Jr., David R. Bourgeois, Dennis W. Chasse and Todd R. Comins, having U.S. Ser. No. 538,695 and filed on Oct. 3, 1983, now abandoned.

BACKGROUND OF THE INVENTION

1. Field of the Invention

This invention relates generally to data collection terminals. This invention relates particularly to apparatus for processing device interrupt signals including such devices as communication controllers.

2. Description of the Prior Art

A data collection terminal is made up of a number of peripheral devices and a microprocessor, all coupled to a common bus. When a peripheral device requests attention, it sends an interrupt signal on the bus to the microprocessor. In the prior art system, a central processor would poll the devices to determine which device interrupted. The central processor would then process the interrupt and generate a unique interrupt vector address on the bus. This required the central processor to utilize hardware and firmware to poll all the devices in the subsystem, prioritize those devices with active interrupts and generate the unique interrupt vectored address to enter into the firmware interrupt service routine.

There are various other types of interrupt processing systems in the prior art which are coupled to provide interrupt service in response to an interrupt signal received from any one of a number of sources such as peripherals connected to an input/output bus. Typically, the procedure followed for servicing interrupts from such peripherals first requires identifying the interrupting peripherals, next requesting the status of the peripheral, and then updating the status. This procedure is relatively slow and, in certain types of systems where interrupt routines are executed frequently, the acknowledge routine time may pose serious speed restraints on the total system. In one such interrupt system, as indicated in U.S. Pat. No. 3,881,174, the interrupt processing apparatus includes a computer which allows a peripheral, upon receiving an acknowledgement from a computer of an interrupt request which the peripheral previously generated, to simultaneously provide the computer with its address and status. This shortens the time required for processing the interrupt routine.

U.S. Pat. No. 4,030,075 describes a data processing system having a distributed priority network. This priority network is coupled with each of the units and indicates which is the highest priority unit requesting to transfer information over the bus. The priority network includes a priority bus with the units coupled closest to one end of the bus having a highest priority and units coupled at the other end of the bus having a lowest priority. All of the above systems have the disadvantage of having considerable hardware and time-consuming cycles to perform the connection to the bus.

The Honeywell 7760 display system is a central processor subsystem which controls a fixed number of peripheral subsystems. The 7760 is described in the "VIP 7760 Subsystem User's Reference Manual", Order No. AT45, Rev. 0, May 1978.

Each peripheral subsystem sends a unique request for an interrupt signal to the central processor subsystem which makes the highest priority peripheral subsystem operative in the display system. The number of peripheral subsystems in the display system is limited to the throughput capability of the central processor subsystem. The interrupt and priority apparatus in the display system can readily process interrupts from the maximum number of peripheral subsystems.

U.S. Pat. No. 4,240,140 describes priority interrupt apparatus for generating vectored addresses which does not have the versatility of the instant invention.

The Intel 8259A Programmable Interrupt Controller provides for more efficient interrupt operation by providing the capability of being used as a master and a slave, whereby readily handling up to 64 vectored priority interrupts. The Intel 8259A controller is described in the "Component Data Catalog 1981" published by Intel Corporation, 3065 Bowers Avenue, Santa Clara, Calif. 95051.

However, the prior art still limits the throughput of such proposal devices such as document handlers and communication cardholders such as universal synchronous asynchronous remote transmit controllers.

OBJECTS OF THE INVENTION

It is accordingly a primary object of the invention to provide an improved operation of a data collection system.

It is another object of the invention to provide improved apparatus for processing device interrupts.

It is another object of the invention to provide improved apparatus for processing interrupts from a certain class of devices including communication controllers.

SUMMARY OF THE INVENTION

A data collection terminal includes a number of devices including a universal synchronous asynchronous receive transmit (USART) communication controller, a random access memory, a read only memory, and a microprocessor, coupled to a common bus.

Devices bid against each other for access to the common bus by generating their respective interrupt request signal. Master interrupt controller 3-24 receives the interrupt request signals from certain devices or from slave interrupt controller 18-2 or 18-4 and generates a microprocessor interrupt signal.

The microprocessor responds to its interrupt signal by generating two occurrences of an interrupt acknowledge signal INTA—. The master interrupt controller 3-24 responds to the first occurrence of the interrupt acknowledge signal INTA— by generating cascade signals CAS0, CAS1 and CAS2 which address slave interrupt controller 18-2, slave interrupt controller 18-4, or USART 3-16.

If a slave interrupt controller is addressed, it responds to the second occurrence of the interrupt acknowledge signal INTA— with the vector address of the requesting device that received access to the microprocessor by requesting access from that slave interrupt controller.

If the USART 3-16 generated its interrupt request signal IRQI−, then the master interrupt controller 3-24 generates the microprocessor 2 interrupt signal INTR+. The microprocessor 2 responds with the first occurrence of interrupt acknowledge signal INTA− which is received by master interrupt controller 3-24 which generates the cascade signal CAS0 at logical ONE and signals CAS1 and CAS2 at logical ZERO. Addressing the USART by the cascade signals forces the IPI− signal to logical ZERO. This conditions the USART 3-16 to accept the second occurrence of interrupt acknowledge signal INTA− to generate the vector address indicative of the operation being performed by the USART 3-16.

When the cascade signals do not address the USART 3-16, then signal IPI− is forced to logical ONE. This results in the USART 3-16 not responding to the second occurrence of interrupt acknowledge signal INTA−. Signal IPI− is forced to logical ONE by setting a flop 3-4 at the end of the first occurrence of interrupt acknowledge signal INTA− forcing signal ACK1− to logical ZERO. The second occurrence of interrupt acknowledge signal INTA− forces signal ACK2− to logical ZERO. Since the cascade signals do not address USART 3-16, signal INTENB+ is at logical ZERO forcing signal IPI− to logical ONE. Flop 3-4 is reset at the end of the second occurrence of interrupt acknowledge signal INTA−.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

DESCRIPTION OF THE PREFERRED EMBODIMENT

Figure 1:
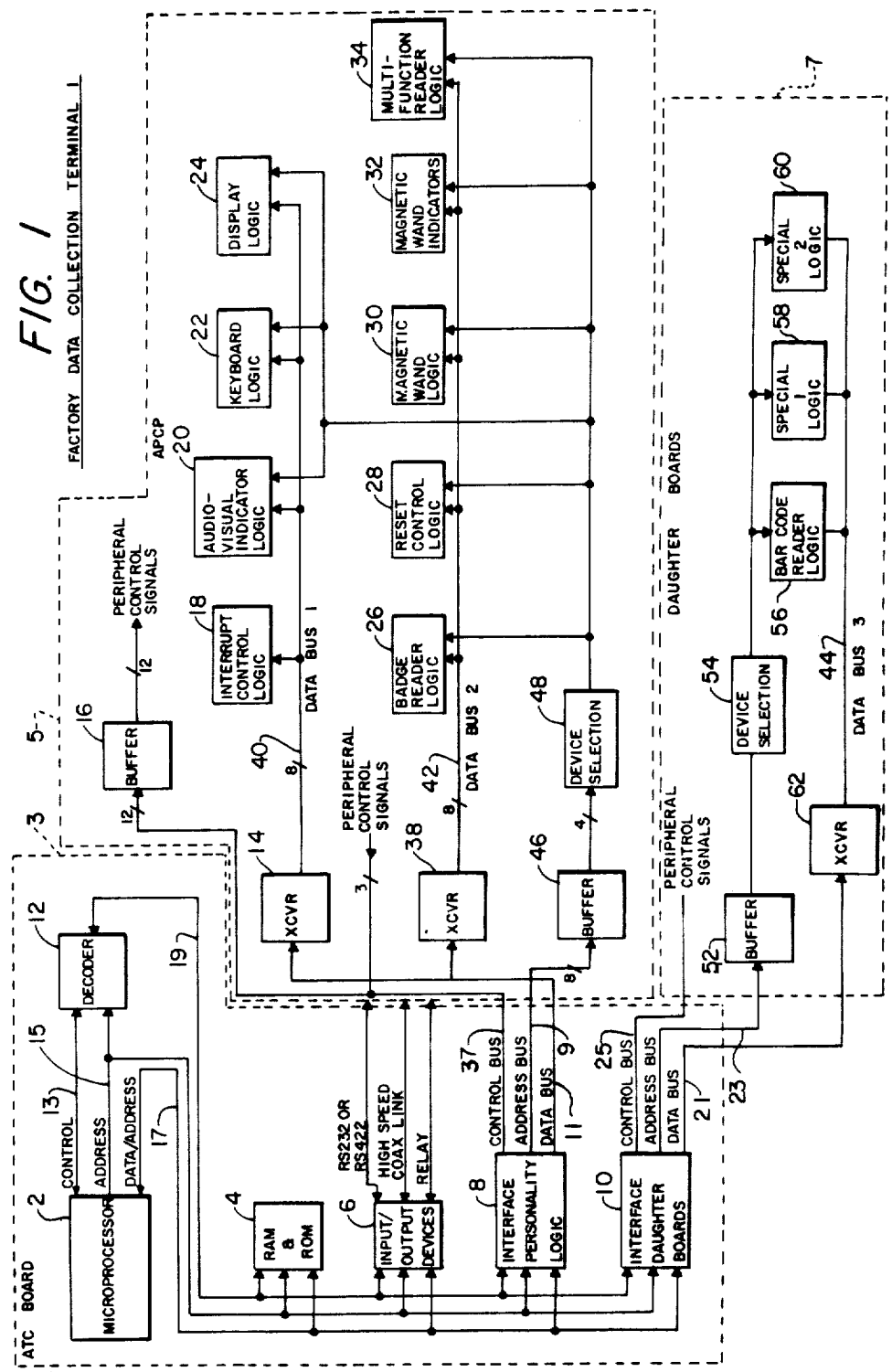
FIG. 1 is a block diagram of the data collection terminal.

FIG. 1 is a logic block diagram of a factory data collection terminal 1. The logic elements are mounted on two logic boards, a terminal controller board (ATC) 3 and a personality controller panel board (APCP) 5. A number of optional daughter boards 7 may be added to the ATC board 3. The ATC board 3 provides the logic for controlling the terminal 1. This logic includes microprocessor 2 which operates with microinstructions and data stored in a random access memory (RAM) and read only memory (ROM) 4 to control the terminal 1. The RAM and ROM 4 store up to 32K bytes of RAM and 32K bytes of ROM.

The microprocessor 2 is an Intel 8088 central processing unit described in the 8086 Family User's Manual, October 1979 published by Intel Corporation, 3065 Bowers Avenue, Santa Clara, Calif. 95051.

Coupled to the microprocessor 2 are a control bus 13, an address bus 15 and a data/address bus 17. A number of logic blocks are coupled to busses 15, 17 and 19.

An input/output device 6 provides logic for controlling an RS232 or an RS422 communication line, a high speed coaxial cable data link handling a 750,000 bit per second serial data stream, and a relay port. Up to 32 terminals 1 may be coupled to a central system (not shown) via the high speed coaxial cable data link.

The relay port controls a relay to control typically an external device such as a door lock solenoid for secure access to an area in the factory or turn on an alarm for work shift changes.

An interface personality logic 8 couples the ATC board 3 to the APCP board 5 via a control bus 37, an address bus 9 and a data bus 11, and an interface daughter board logic 10 couples the ATC board 3 to a number of daughter boards. The ATC board 3 can support up to 3 daughter boards.

A decoder 12 receives control signals and address signals from the microprocessor 2 over busses 13 and 15 to generate control signals over bus 19, and receives control signals over bus 19 for transfer to the microprocessor 2 over bus 13.

A number of types of APCP boards 5 are available. One type of APCP board 5 may provide the terminal 1 with a labor reporting personality wherein the terminal 1 provides manufacturing information, or another APCP board 5 may perform as a timeclock. In general, the APCP board 5 contains a number of peripheral logical blocks. Another type of APCP board 5 for labor reporting would include typically a badge reader logic 26, a reset control logic 28, a magnetic wand logic 30, a magnetic wand indicator 32 and a multifunction reader interface logic 34, all coupled in common to a data bus 2 42; and an interrupt control logic 18, an audio-visual indicator logic 20, a keyboard logic 22 and a display logic 24, all coupled in common to a data bus 1 40.

The badge reader logic 26 interfaces an employee identification badge reader (not shown) to the terminal 1. This provides the terminal 1 with the information necessary to identify the terminal 1 operator who is providing input information. The reset control logic 26 gives the software and firmware reset control over the devices coupled to the APCP board 5. The magnetic wand logic 30 allows a hand-held magnetic wand (not shown) and a "swipe" reader (not shown) to read information on credit cards or similar documents.

The magnetic wand indicator 32 controls the indicators on the magnetic wand to give the operator signals that the magnetic wand read the information correctly from the card.

The multifunction reader logic 34 includes interfaces to a number of devices (not shown) including typically a motorized reader. The motorized reader is capable of reading 80 and 60 column cards as well as 22 column plastic badges.

The display logic 24 controls a one row by 40 character display which is capable of displaying the full ASCII character set in several modes, including a cursor mode, a mode for inserting or replacing characters, a blinking mode or a mode for turning the display on or off.

The keyboard logic 22 includes a sealed laminated keyboard using membrane technology (not shown) which is used for data entry.

The audio-visual indicator logic 20 controls audible alarms and LED indicators to give the operator information that the inputs to the terminal 1 were in the proper format and that the proper input procedures were used.

The interrupt control logic 18 receives interrupt requests from the other control logic blocks on the APCP board 5 and couples the highest priority device to the ATC board 3 for transfer of information between the device and RAM and ROM 4 under microprocessor 2 control. The interrupt control logic 18 also, under firmware or software control, causes the peripheral devices to be activated or deactivated.

Bidirectional data bus 1 40 is coupled to the interface personality logic 8 via a transceiver (XCVR) 14 and data bus 11. Bidirectional data bus 2 42 is coupled to the interface personality logic 8 via a transceiver 48 and data bus 11.

A buffer 46 applies address signals received via an address bus to a device selection 48 which generates a separate peripheral enable signal for each peripheral device logic block on the APCP board 5. Only one peripheral device may be enabled for a data cycle on data bus 1 40 or data bus 2 42.

A buffer 16 receives control signals from control bus 7 for transfer to the peripheral device. A number of control signals are transferred to control bus 7 from the peripheral devices. These control signals are described infra.

A number of peripheral devices are coupled to the interface daughter boards 10 via a data bus 21, a XCVR 62 and data bus 3 44. These devices include a bar code reader (not shown) coupled to data bus 3 44 via a bar code reader logic 56 and a number of unspecified devices coupled to data bus 3 44 via special 1 logic 56 and special 2 logic 60. Whereas each of the logic blocks coupled to the interface personality logic are mounted on the APCP board 5, the three logic blocks, bar code reader logic 56, special 1 logic 58 and special 2 logic 60, coupled to the interface daughter boards 10 are mounted on individual daughter boards which are physically connected to the ATC board 3.

A buffer 52 receives address signals from address bus 23 which are applied to device selection 54. Device selection 54 provides enable signals to activate the logic of a selected daughter board. Peripheral control signals are transferred between the daughter boards and the interface daughter boards 10 via a control bus 25.

Figure 2:
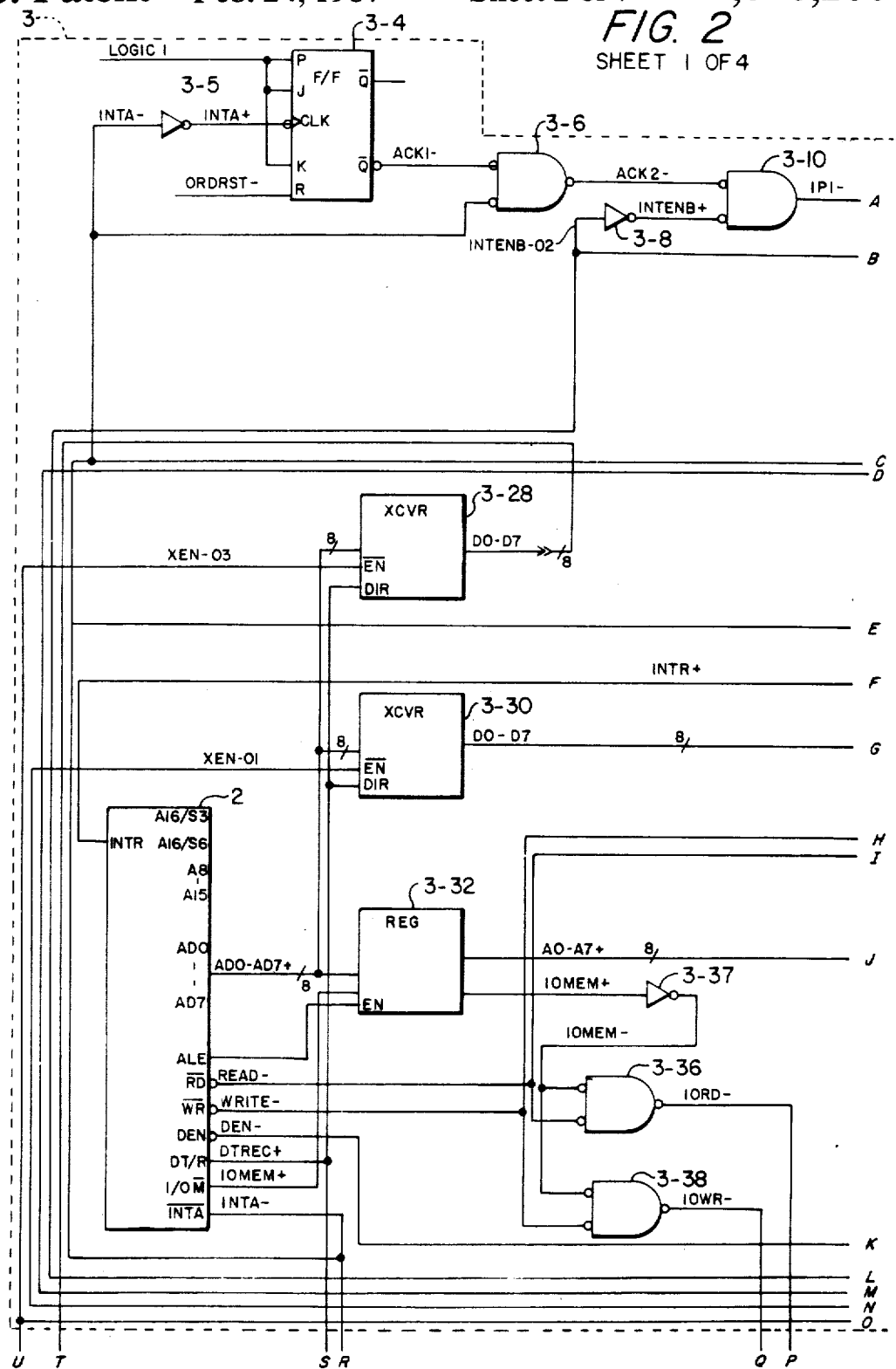
FIG. 2 is a logic diagram of the interrupt system.
Figure 2:
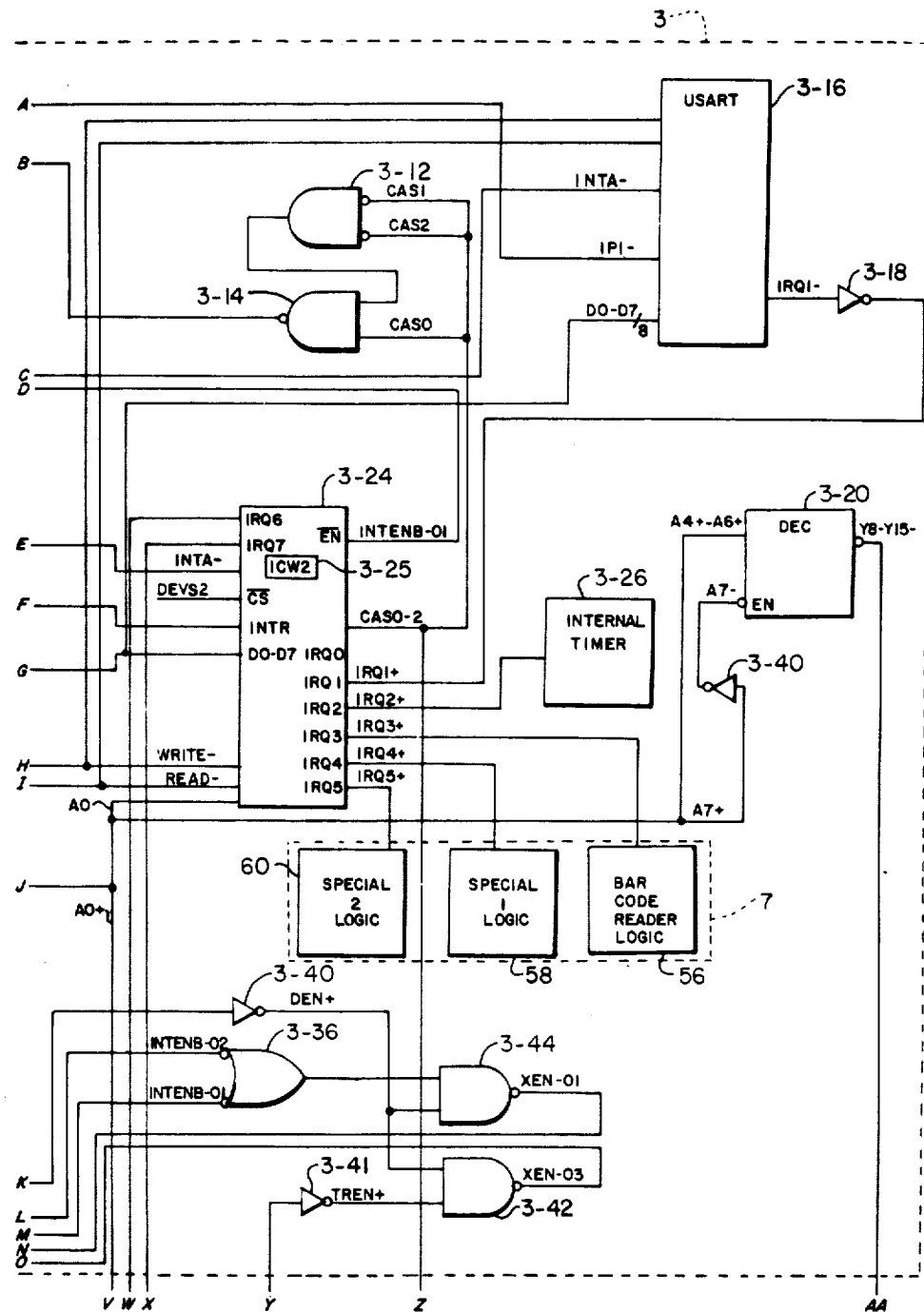
Figure 2:
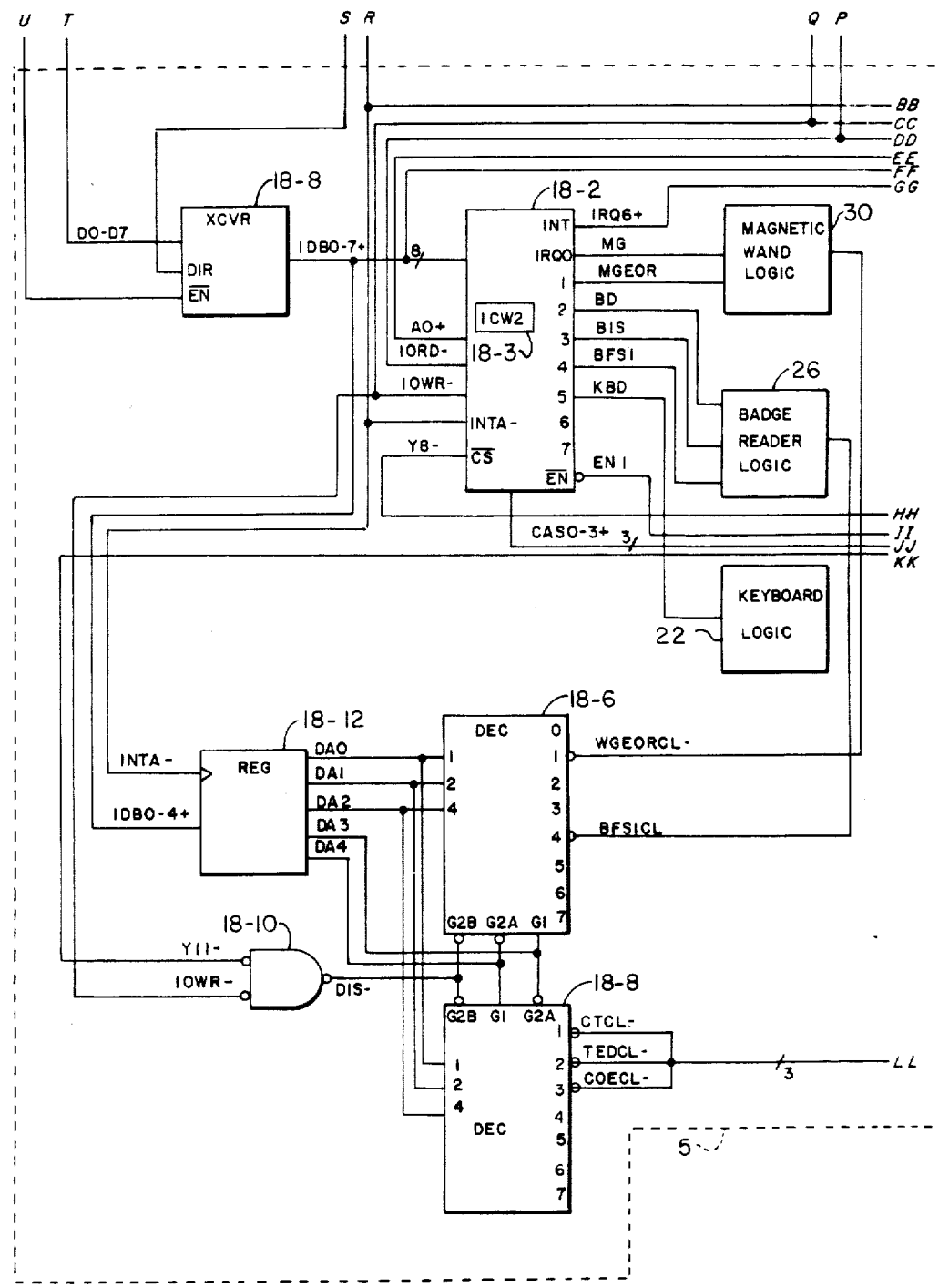
Figure 2:
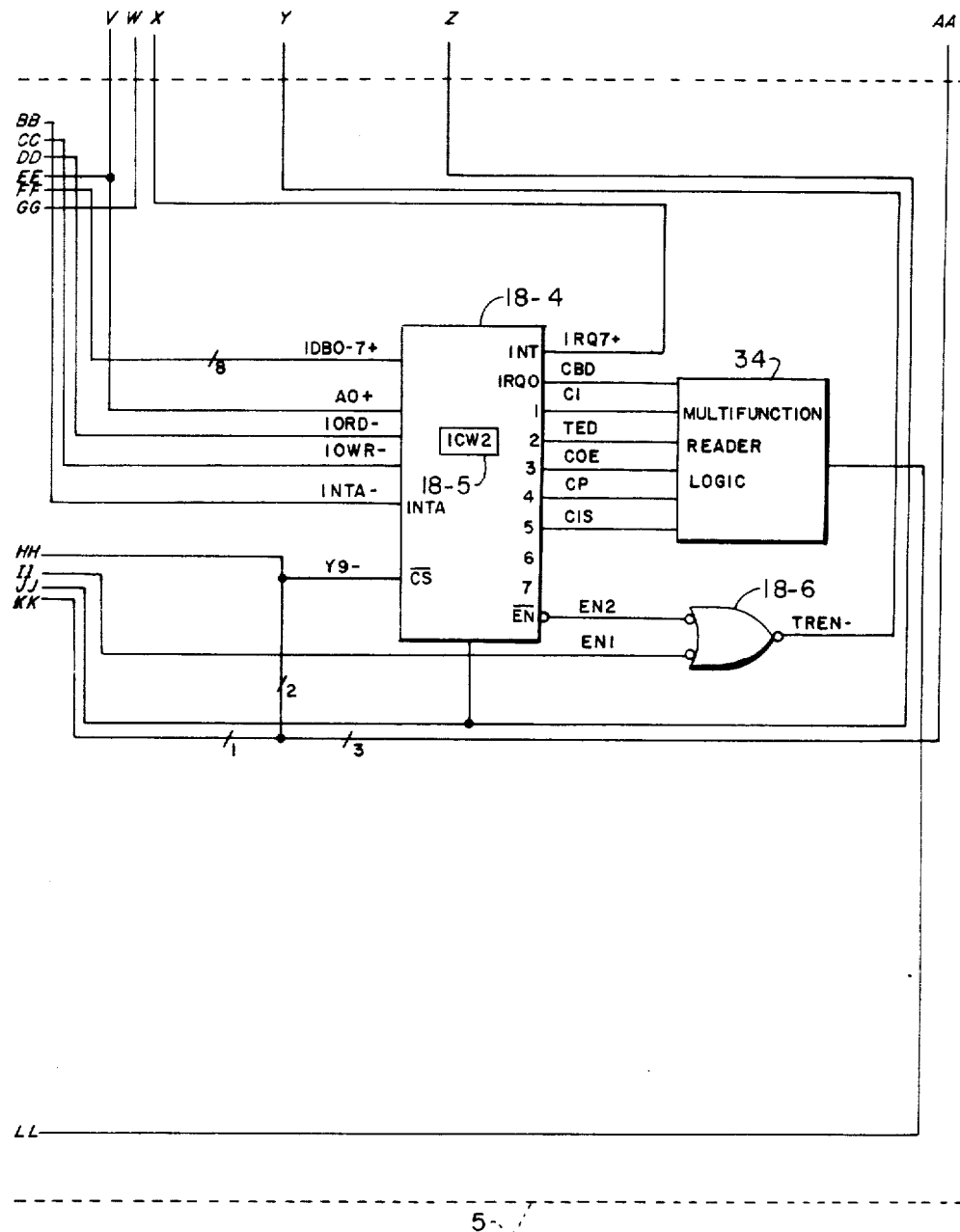

FIG. 2 shows the interrupt operation of the peripheral devices. The microprocessor 2 controls the operation of the elements of terminal 1. As an example, if a peripheral device requires a transfer of information between RAM and ROM 4 and the device, a unique signal is generated by the peripheral device. Sensing this signal causes one of the interrupt controllers to interrupt the microprocessor 2 which acknowledges the interrupt. The interrupt controller responds to the acknowledge signal by generating a unique vector address; microprocessor 2 receives the unique vector address and branches to a microprogram which controls the information transfer. Other interrupt signals are generated by the peripheral device to inform the microprocessor 2 that a particular event has occurred, for example, a badge is inserted in the badge reader. This conditions the microprocessor 2 to branch to a microprogram to receive data read from the badge.

Since the microprocessor 2 is controlling all of the functions of terminal 1, the interrupt operation allows for efficient control of the terminal 1 by the microprocessor 2.

The microprocessor 2 processes two classes of interrupts from the peripheral devices. The first class of interrupt having a higher priority are those operations whereby data is being transferred between the peripheral device and RAM and ROM 4. The second class of interrupt having a lower priority are those operations whereby the peripheral device is presenting a status of punched card or badge in a reader. Microprocessor 2 is responsive to that interrupt to generate signals which are decoded to, for example, turn on a card reader motor or to activate a badge read mechanism.

Terminal 1 includes an interrupt controller 3-24 which acts as a master interrupt controller and two interrupt controllers 18-2 and 18-4 which act as slave interrupt controllers. Coupled to the master interrupt controller 3-24 is the interrupt signal IRQ1+ for a universal synchronous asynchronous remote transceiver (USART) 3-16, interrupt signal IRQ2+ for an internal timer 3-26, interrupt signal IRQ3+ for the bar code reader 56, interrupt signal IRQ4+ for special 1 logic 58, and interrupt signal IRQ5+ for special 2 logic 60 peripheral controllers. Note that special 1 logic 58 and special 2 logic 60 refer to undefined peripheral devices and controllers to be installed in the future.

Interrupt signal MG is applied to interrupt terminal IRQ0+ of interrupt controller 18-2. Signal MG indicates that the magnetic wand logic 30 is ready to transfer data signals to RAM and ROM 4.

Interrupt signal MGEOR from magnetic wand logic 30 is applied to interrupt terminal IRQ1+ of interrupt controller 18-2. Signal MGEOR indicates that the magnetic wand logic 30 finished reading the document.

Interrupt signals BD, BIS and BFSI of badge reader logic 26 are applied to interrupt terminals IRQ2, IRQ3 and IRQ4, respectively, of interrupt controller 18-2. Signal BD indicates that badge reader logic 26 has data to transfer to the RAM of RAM and ROM 4. Signal BIS indicates that the badge is inserted in the badge reader and signal BFSI indicates that the badge is fully seated in the badge reader.

Interrupt signal KED is applied to interrupt terminal IRQ5 of interrupt controller 18-2 indicating that keyboard logic 22 has data to transfer to the RAM of RAM and ROM 4.

Interrupt signals CBD, CI, TED, COE, CP and CIS from multifunction reader logic 34 are applied to interrupt terminals IRQ0 through IRQ5, respectively, of interrupt controller 18-4. Signal CBD indicates that the multifunction reader logic 34 has data to transfer to RAM and ROM 4. Signal CI indicates that a card is inserted into the reader. Signal TED indicates that the trailing edge of the card has passed through the reader. Signal COE indicates that there was a card-oriented error. Signal CP indicates that a card is present in the reader. Signal CIS indicates that column one of the card is under the read head of the reader. These interrupt signals indicate to the microprocessor 2 to start the reader motor to feed the card when the CI signal is applied to interrupt controller 18-4 and to stop the reader motor when the TED signal is applied to the interrupt controller 18-4. The CP signal applied to the interrupt controller 18-4 results in the interrupt controller 18-4 indicating to the microprocessor 2 that the card is in the reader and to await signals CIS and CBD to transfer data to RAM. The COE signal applied to interrupt controller 18-4 results in microprocessor 2 branching to an error routine which will delete from the RAM of RAM and ROM 4 any data stored in memory which was read from that card and indicates to the operator that the punched card should be reinserted if the information in the punched card is correct.

In the event that a number of the devices requests access to RAM and ROM 4 by generating their respective interrupt signals, those devices having their interrupt signals coupled to interrupt controller 3-24 receive first or higher priority, those devices having their interrupt signals coupled to interrupt controller 18-2 receive second priority, and those devices having their interrupt signals coupled to interrupt controller 18-4 receive third or lowest priority. Within an interrupt controller, the IRQ0 input terminal has highest priority and the IRQ7 terminal has lowest priority. In summary, signal IRQ1+ applied to input terminal IRQ1 of master interrupt controller 3-24 has highest priority and signal CIS applied to input terminal IRQ5 of slave interrupt controller 18-4 has the lowest priority of all of the signals applied to the IRQ input terminals of interrupt controllers 3-24, 18-21 and 18-3.

The interrupt logic operates in the following manner. Assume the multifunction reader logic 34 generates signal COE which is applied to interrupt controller 18-4 indicating that the card is not oriented properly in the reader. The interrupt controller 18-4 responds by generating signal IRQ7+ which is applied to the interrupt terminal IRQ7 of interrupt controller 3-24. Interrupt controller 3-24 generates interrupt signal INTR+ which is applied to microprocessor 2 which acknowledges the interrupt by generating interrupt acknowledge signal INTA−. Interrupt controller 3-24 is responsive to signal INTA− by generating CAS0, CAS1 and CAS2 identifying the interrupt controller 18-4 which initiated the interrupt request. In response to signals CAS0, CAS1 and CAS2, interrupt controller 18-4 generates signal EN2 at logical ZERO which is applied to a negative OR gate 18-6 to generate output signal TREN− at logical ZERO which is inverted by an inverter 3-41 to signal TREN+. Signal DEN+ from an inverter 3-40 at logical ONE is applied to a NAND gate 3-42 to generate signal XEN-03 at logical ZERO. Signal XEN-03 enables a XCVR 3-28 and a XCVR 18-8. Signal DTREC+ from microprocessor 2 is applied to the direction selection terminals of XCVR's 18-8 and 3-28 to transfer vector signals generated by interrupt controller 18-4 when interrupt controller 18-4 receives a second interrupt acknowledge signal INTA− from microprocessor 2, that is, on the fall of the second INTA− signal. The vector signals IDB-0-7+ are applied to microprocessor 2 via XCVR 18-8, signals D0–D7, XCVR 3-28, and signals AD0+ through AD7+. Microprocessor 2 uses the vector signals to generate the starting address in RAM and ROM 4 of a microprogram which will process the card-oriented error routine.

For the interrupt clear operation, the vector signals IBD0+ through IBD4+ are stored in a register 18-12 on the rise of the second interrupt acknowledge signal INTA−. Output signals DA0 through DA4 are applied to the input terminals of decoders 18-6 and 18-8. Signals DA0 through DA2 applied to select terminals 0, 1 and 2 select one of eight output terminals of decoders 18-6 and 18-8. The interrupt clear operation is controlled by microprocessor 2 generating signals Y11− and IOWR− at logical ZERO which are applied to a negative AND gate 18-10. Output signal DIS− at logical ZERO enables both decoders 18-6 and 18-8. Signal DA3 at logical ONE applied to terminal G1 of decoder 18-6 enables decoder 18-6 and signal DA4 at logical ONE applied to terminal G1 of decoder 18-8 enables decoder 18-8. Signal DA3 at logical ONE applied to terminal G2A of decoder 18-8 disables decoder 18-8 and signal DA4 at logical ONE applied to terminal G2A of decoder 18-6 disables decoder 18-6. Signal Y11− is generated by address signals A4+ through A7+ applied to a decoder 3-20 via a register 3-32, signals AD4+ through AD7+ and microprocessor 2. Signal A7−, the output of an inverter 3-40, enables decoder 3-20. Register 3-32 is enabled by the microprocessor 2 address latch enable signal ALE. Signal IOWR− indicates a microprocessor 2 input/output write control signal which is generated by a microinstruction to cause a clear interrupt operation. Signal WRITE− and IOMEM− at logical ZERO applied to a negative AND gate 3-38 generates the IOWR− signal at logical ZERO.

Signals DA0 and DA1 at logical ONE, signals DA2 and DA3 at logical ZERO, and signal DA4 at logical ONE generates the card error interrupt clear signal COECL− which is applied to multifunction reader logic 34 to reset the card error interrupt. The other clear signals from decoders 18-6 and 18-8 are generated in a similar manner.

Assume the magnetic wand logic 30 generates an end of read interrupt signal MGEOR which is applied to interrupt terminal IRQ1 of interrupt controller 18-2 which generates signal IRQ6+. Signal IRQ6+ is applied to interrupt terminal IRQ6 of interrupt controller 3-24. Signal INTR+ interrupts microprocessor 2 which generates interrupt acknowlege signal INTA− indicating that microprocessor 2 is conditioned to accept the interrupt. Interrupt controller 3-24 responds to the fall of signal INTA− by generating signals CAS0, CAS1 and CAS2. Interrupt controller 18-2 responds to signals CAS0, CAS1 and CAS2 by sending out its vector address on the data bus. Again XCVR's 3-28 and 18-8 are enabled to transfer the vector address to microprocessor 2. The vector address is stored in register 18-12 on the rise of the interrupt acknowledge signal INTA−. In this case, decoder 18-6 is enabled and signal WGEORCL− is generated to clear the end of read interrupt, signal WGEOC in magnetic wand logic 30.

A number of peripheral devices generates interrupt request signals which are applied directly to master interrupt controller 3-24. Assume that an internal timer 3-26 generates an interrupt signal IRQ2+ when a pretimed event occurred. The interrupt controller 3-24 generates signal INTR+ to interrupt the microprocessor 2 which generates the interrupt acknowledge signal INTA−. The interrupt controller 3-24 responds to the second occurrence of the fall of signal INTA− to generate signal INTENB-01 which enables XCVR 3-30 via a negative NOR gate 3-36, a NAND gate 3-44, signal XEN-01 and XCVR 3-30. The direction of the signal accepted by XCVR 3-30 is specified by transmit receive signal DTREC+ from microprocessor 2. The interrupt controller 3-24 is responsive to the second occurrence of interrupt acknowledge signal INTA− to generate the vector address signals which it sends to microprocessor 2 via signals D0 through D7, XCVR 3-30 and signals AD0+ through AD7+. The vector address signals are used by the microprocessor 2 to branch to the first microwords of the microprogram which processes the internal timer 3-26. Interrupt signals IRQ3+, IRQ4+ and IRQ5+ are processed in a similar manner to the signal IRQ2+ from internal timer 3-26.

The interrupt operation of the USART 3-16 operates differently than the other peripheral devices in terminal 1 in that USART 3-16 generates its own vector addresses. Note that the interrupt controller generates the vector address for those peripheral logic units which are coupled to that interrupt controller. Since USART's may generate a number of different vector addresses representing different modes of operation, the interrupt operation is speeded up by having the USART generates the vector address. As an example, one vector address generated by the USART may point to a microprogram for processing a communication line receive transmission, another vector address may point to a microprogram for processing a communication line transmit transmission. The USART 3-16 is an Intel 8274 described in the "Microprocessor and Peripheral Handbook 1983" published by Intel Corporation.

If the USART 3-16 requested access to microprocessor 2, then signal IRQ1− which is applied to an inverter 3-18 is generated. Output signal IRQ+ is applied to the IRQ1 interrupt terminal of interrupt controller 3-24 which responds by generating microprocessor 2 interrupt signal INTR+. Microprocessor 2 generates the first occurrence of interrupt acknowledge signal INTA− which is received by interrupt controller 3-24. Interrupt controller 3-24 generates the cascade signal CAS0 at logical ONE and cascade signals CAS1 and CAS2 at logical ZERO which are applied to a negative NAND gate 3-12 and a NAND gate 3-14 to generate signal INTENB-02 at logical ZERO and signal INTENB+, the output of an inverter 3-8, to logical ONE. Signal INTENB+ at logical ONE applied to a negative NAND gate 3-10 forces signal IPI− to logical ZERO. This conditions USART 3-16 to respond to the second occurrence of interrupt acknowledge signal INTA− by sending the vector address signals D0 through D7 corresponding to the operation required by USART 3-16 to microprocessor 2 via transceiver 3-30. Transceiver 3-30 is enabled by signal INTENB-02 at logical ZERO, negative NOR gate 3-36, NAND gate 3-44 and signal XEN-01 at logical ZERO. The direction signal DTREC+ conditions XCVR 3-30 to transfer vector address signals D0 through D7 to microprocessor 2 as signals AD0+ through AD7+.

Initially, signal IPI− is at logical ZERO to condition USART 3-16 to generate an interrupt request. Flop 3-4 is reset by signal ORDRST− on "power up" or by microprocessor 2. Output signal ACK1− is at logical ONE as is interrupt acknowledge signal INTA−, thereby forcing output signal ACK2−, the output of a negative AND gate 3-6, to logical ONE. This forces signal IPI−, the output of negative NAND gate 3-10, to logical ZERO.

If a device other than USART 3-16 requested an interrupt of interrupt controller 3-24, then when microprocessor 2 generates the first occurrence of interrupt acknowledge signal INTA− in response to interrupt signal INTR+, interrupt controller 3-24 generates cascade signals CAS0, CAS1 and CAS2 which address either interrupt controller 18-2 or 18-4. Signal INTENB-02, the output of NAND gate 3-14, is at logical ONE and signal INTENB+, the output of inverter 3-8, is at logical ZERO. The first occurrence of interrupt acknowledge signal INTA− at logical ZERO is applied to an inverter 3-5 to generate signal INTA+ at logical ONE. Flop 3-4 is set on the fall of signal INTA+, that is, as the interrupt acknowledge signal INTA− goes to logical ONE. Signal ACK1− is set to logical ZERO forcing signal ACK2− to logical ZERO, thereby forcing signal IPI− to logical ONE. This conditions USART 3-16 to ignore the second occurrence of interrupt acknowledge signal INTA−. However, flop 3-4 is reset at the end of the second occurrence of interrupt acknowledge signal INTA− by the fall of signal INTA+. Flop 3-4 is a 74S112 circuit element described in the "TTL Data Book for Design Engineers", Second Edition, published by Texas Instruments, 1976.

During a status write operation, a register ICW2 3-25 in interrupt controller 3-24 and a register ICW2 18-5 in interrupt controller 18-4 are loaded with the vector address for the respective IR0 interrupt terminal. The outputs of these registers are incremented by the priority position (IRQ0 through IRQ7) to generate the vector address.

To write the initial vector address in register 3-25 of interrupt controller 3-24, microprocessor 2 generates a number of signals. Address signal A0 from register 3-32 indicates a status operation, signal WRITE− indicates that the interrupt controller 3-24 will receive data, and signal DEVS2 generated from microprocessor 2 address signals selects interrupt controller 3-24. The boolean equation for DEVS2 is as follows:

$$\overline{AD4} \cdot \overline{AD5} \cdot AD6 \cdot \overline{AD7} \cdot \overline{A8} \cdot \overline{A9} \cdot \overline{A10} \cdot \overline{A11} \cdot IOMEM+$$

where signal IOMEM+ indicates an input/output operation and not a RAM and ROM 4 operation. If signal READ− is applied to interrupt controller 3-24 in place of the signal WRITE−, then the contents of register ICCW2 18-3 are transferred to microprocessor 2.

Registers ICW2 18-3 and ICW2 18-5 are loaded in a similar manner. Signal Y8− from decoder 3-20 selects interrupt controller 18-4. Again, address signal A0 indicates the status mode. Signal WRITE− is applied to negative AND gate 3-38 along with signal IOMEM− to generate signal IOWR− indicating an input/output write operation. Signal READ− is applied to negative AND gate 3-36 along with signal IOMEM− to generate signal IORD− including an input/output read operation signal. Signal IOMEM+ is generated by an inverter 3-37. Signal IOMEM+ is generated by microprocessor 2 to indicate an input/output operation.

Figure 3:
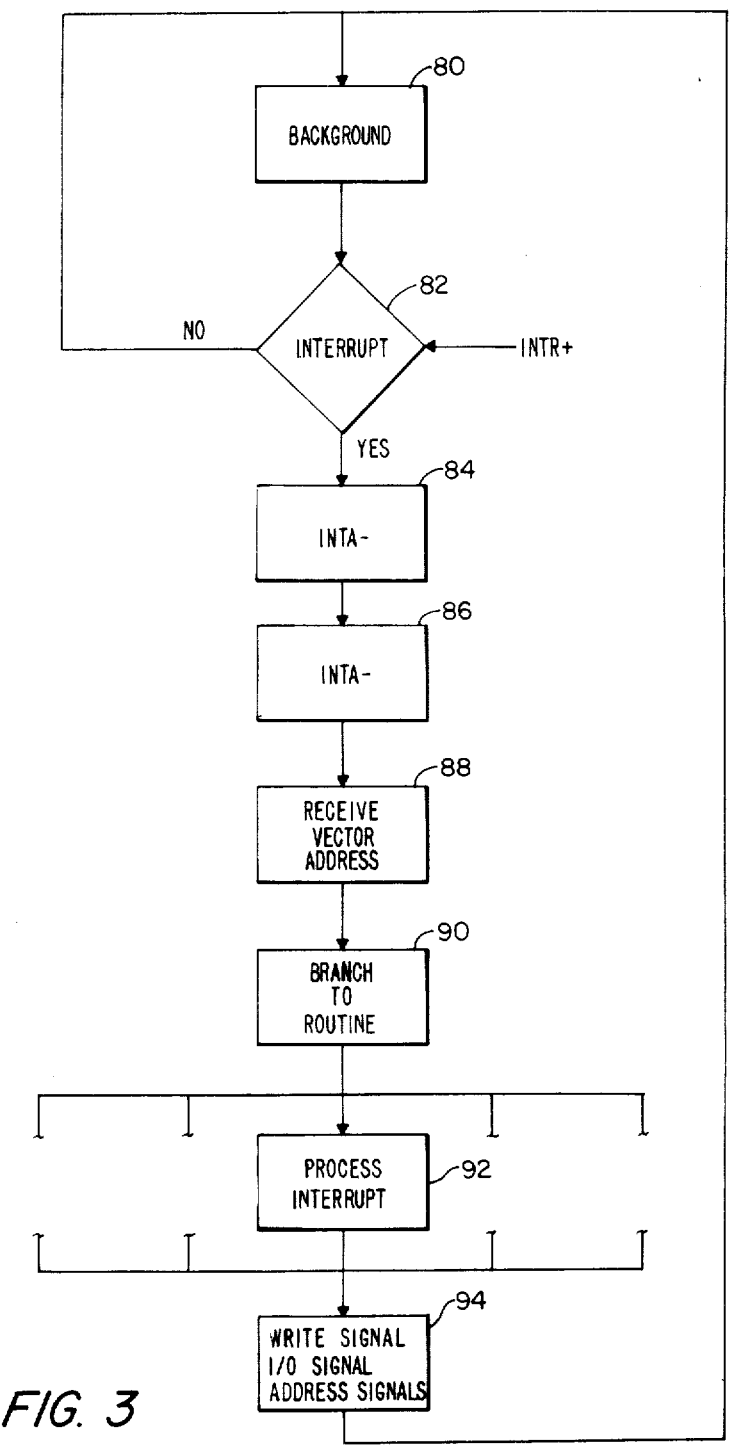
FIG. 3 is a block diagram of the microprocessor interrupt microprogram.

FIG. 3 shows a block diagram of the microprocessor interrupt microprogram. Block 80 shows the microprocessor 2 executing a background microprogram.

Periodically, decision block 82 is tested to determine if microprocessor interrupt signal INTR+ was generated by interrupt controller 3-24. If signal INTR+ was not received, then microprocessor 2 continues to execute the background microprogram.

When signal INTR+ is received and tested by decision block 82, the interrupt microprogram branches to block 84 which generates the first occurrence of interrupt acknowledge signal INTA−.

Block 86 then generates the second occurrence of interrupt acknowledge signal INTA−.

Block 88 receives the vector address which is used in block 90 to branch to a microprogram to process in block 92 the particular device requesting the interrupt.

After the interrupt is processed, block 94 generates signals WRITE− and IOMEM+ to generate signal IOWR− and address signals A4+ through A7+ which are applied to decoder 3-10 to generate signal Y11−. Signals Y11− and IOWR− are applied to negative AND gate 18-10 to enable decoders 18-6 and 18-8 to generate the clear interrupt signals.

Figure 4:
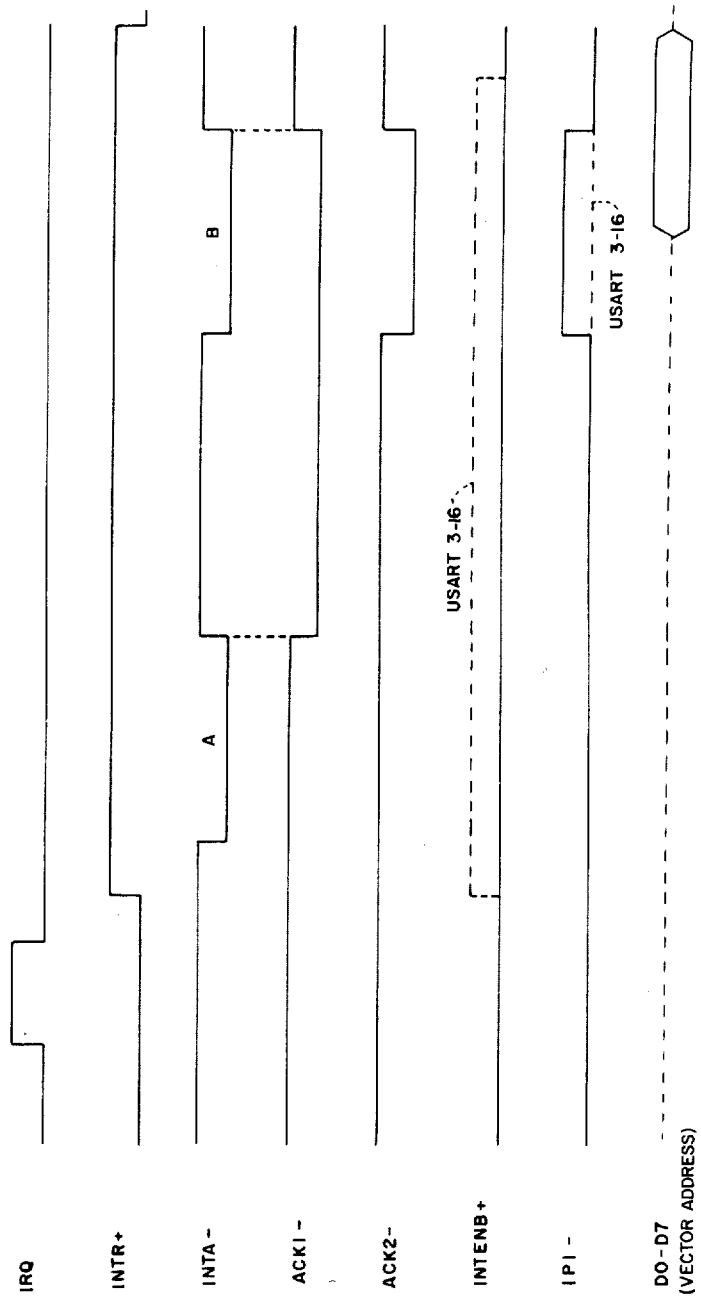
FIG. 4 is a timing diagram of the interrupt logic associated with a universal synchronous asynchronous receive transmit communication controller.

FIG. 4 is a timing diagram showing the interrupt logic sequence control of the USART 3-16 enable signal IPI−.

IRQ indicates a request by a peripheral device which is applied to an interrupt controller. INTR+ shows the timing of the interrupt signal INTR+ generated by interrupt controller 3-24 to interrupt microprocessor 2.

INTA— indicates the timing of the interrupt acknowledge signal with the first occurrence at A time and the second occurrence at B time.

ACK1— indicates the setting of flop 3-4 at the time of the rise of the first occurrence of INTA— and the resetting of flop 3-4 at the time of the rise of the second occurrence of INTA—.

ACK2— shows the output signal timing of negative AND gate 3-6. Its timing coincides with the timing of the second occurrence of INTA—.

INTENB+ indicates that USART 3-16 generated our interrupt request (dotted) and that another device generated an interrupted request (solid).

IPI— (dotted) indicates that USART 3-16 requested an interrupt and IPI— (solid) indicates that USART 3-16 did not request an interrupt and will therefore not respond to the interrupt acknowledge signal INTA—.

D0 through D7 shows the timing of the vector address sent to microprocessor 2 from interrupt controller 3-24, 18-2, 18-4, or USART 3-16.

Having shown and described a preferred embodiment of the invention, those skilled in the art will realize that many variations and modification may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A data collection terminal comprises:
   microprocessor means;
   a plurality of first devices and at least one second device, each of said plurality of first devices and said at least one second device being coupled to a respective one of a plurality of interrupt request signal lines, one of said plurality of first devices and said at least one second device generating one of a plurality of interrupt request signals on said one of said plurality of interrupt request signal lines when said one of said plurality of first devices and said at least one second device requires said microprocessor means to process an interrupt;
   interrupt controller means coupled to said each of said plurality of interrupt signal lines for receiving said one of said plurality of interrupt request signals and generating a microprocessor interrupt signal, said each of said plurality of interrupt signal lines being coupled to said interrupt controller means establishing a predetermined priority in accordance with a terminal of said interrupt controller means to which said each of said plurality of interrupt signal lines is coupled;
   said microprocessor means being coupled to said interrupt controller means for receiving said microprocessor interrupt signal and generating a first and a second occurrence of an interrupt acknowledge signal when said microprocessor means is ready to process the interrupt;
   said interrupt controller means being coupled to said microprocessor means to receive said interrupt acknowledge signal for generating a plurality of cascade signals on first occurrence of said interrupt acknowledge signal when said one of said plurality of first devices and said at least one second device generates said one of said plurality of interrupt request signals, said interrupt controller means generating a first plurality of vector address signals on second occurrence of said interrupt acknowledge signal when said one of said plurality of first devices generated said interrupt request signal;
   said one of said at least one second device including selection means for generating an enable signal thereby enabling said one of said at least one second device to generate said one of said plurality of interrupt request signals;
   said selection means being coupled to said interrupt controller means to receive a first plurality of said plurality of cascade signals when said one of said at least one second device generated said interrupt request signal and on receipt thereof to address said one of said at least one second device and to generate said enable signal on said second occurrence of said interrupt acknowledge signal, said one of said at least one second device generating a second plurality of vector address signals on receipt of said enable signal and said second occurrence of said interrupt acknowledge signal;
   said microprocessor means receiving said first vector address signals from said interrupt controller means when said one of said plurality of first devices generated said interrupt request signal and said second vector address signals from said one of said second devices when said one of said at least one second device generated said interrupt request signal for branching to a microprogram to process the interrupt.

2. The terminal of claim 1 wherein said at least one second device includes a communication controller wherein said predetermined priority of said communication controller is a first priority.

3. The terminal of claim 2 wherein said plurality of first devices includes an internal timer having a second priority and a bar code reader having a third priority.

4. The terminal of claim 3 wherein said interrupt controller means comprises:
   master interrupt controller means coupled to said communication controller and receiving a first of said plurality of interrupt request signals from said communication controller for generating said microprocessor interrupt signal when said communication controller requires said microprocessor means to process the interrupt, said master interrupt controller means being coupled to said internal timer and receiving a second of said plurality of interrupt request signals from said internal timer for generating said microprocessor interrupt signal when said internal timer requires said microprocessor means to process the interrupt, said master interrupt controller means being coupled to said bar code reader and receiving a third of said plurality of interrupt request signals for generating said microprocessor interrupt signal when said bar code reader requires said microprocessor means to process the interrupt.

5. The terminal of claim 4 wherein said first and said second occurrence of said interrupt acknowledge signal each has a leading edge at the start of the signal and a trailing edge at the finish of the signal.

6. The terminal of claim 5 wherein said selection means comprises:

first selection means for generating a first acknowledge signal in a second state prior to said first occurrence of said interrupt acknowledge signal; and second selection means coupled to said first selection means and responsive to said first acknowledge signal in said second state for generating said enable signal in a first state, said communication controller being responsive to said enable signal in said first state for generating said one of said plurality of interrupt request signals if said communication controller requires said microprocessor means to process said interrupt.

7. The terminal of claim 6 wherein said first selection means generates said first acknowledge signal in a second state after said first and said second occurrences of said interrupt acknowledge signal.

8. The terminal of claim 7 wherein said selection means further comprises:

third selection means coupled to receive a first plurality of cascade signals addressing said one of said at least one second device for generating a second acknowledge signal in a second state.

9. The terminal of claim 8 wherein said second selection means is coupled to receive said second acknowledge signal in said second state for generating said enable signal in said first state, said communication controller being coupled to receive said enable signal in said first state and said second occurrence of said interrupt acknowledge signal for generating said second plurality of vector address signals.

10. The terminal of claim 9 wherein said third selection means is coupled to receive a second plurality of cascade signals for generating said second acknowledge signal in a first state, said second selection means being coupled to receive said second acknowledge signal in said first state for generating said enable signal in a second state, said communication controller being coupled to receive said enable signal in said second state for not responding to said second occurrence of said interrupt acknowledge signal.

11. The terminal of claim 10 wherein said first selection means comprises:

a flip flop having means for resetting and generating a third acknowledge signal in a second state, said flip flop being set by said trailing edge of said first occurrence of said interrupt acknowledge signal thereby generating said third acknowledge signal in a first state;

a negative AND gate coupled to receive said third acknowledge signal in said second state for generating said first acknowledge signal in said second state, and coupled to receive said third acknowledge signal in said first state and said first occurrence of said interrupt acknowledge signal for generating said first acknowledge signal in said first state.

12. The terminal of claim 11 wherein said third selection means comprises:

a first negative NAND gate coupled to receive a second cascade signal in a first state and a third cascade signal in a first state for generating a fourth cascade signal in a second state;

a positive NAND gate coupled to receive a first cascade signal in a second state and said fourth cascade signal in said second state for generating said select signal in a first state; and an inverter coupled to receive said select signal in said first state for generating said second acknowledge signal in said second state;

said first cascade signal in said second state and said second and said third cascade signals in said first state forming said first plurality of said plurality of cascade signals.

13. The terminal of claim 12 wherein said second selection means comprises:

a second negative NAND gate coupled to receive said first acknowledge signal in said second state or said second acknowledge signal in said second state for generating said enable signal in said first state.

14. The terminal of claim 13 wherein said first selection means is shared by said each of said at least one second device and, wherein said selection means includes a plurality of said second and said third selection means, one of said plurality of said second and said third selection means being associated with said each of said at least one second device.

* * * * *